United States Patent
Backman

(10) Patent No.: US 9,178,608 B2
(45) Date of Patent: Nov. 3, 2015

(54) METHOD IN WIRELESS NETWORK USING RELAYS

(75) Inventor: Anders Backman, Göteborg (SE)

(73) Assignee: SAAB AB, Linköping (SE)

( * ) Notice: Subject to any disclaimer, the term of this patent is extended or adjusted under 35 U.S.C. 154(b) by 788 days.

(21) Appl. No.: 13/508,837

(22) PCT Filed: Nov. 9, 2009

(86) PCT No.: PCT/SE2009/051277
§ 371 (c)(1), (2), (4) Date: Jul. 23, 2012

(87) PCT Pub. No.: WO2011/056112
PCT Pub. Date: May 12, 2011

(65) Prior Publication Data
US 2012/0281626 A1    Nov. 8, 2012

(51) Int. Cl.
H04B 7/26 (2006.01)
H04W 84/04 (2009.01)

(52) U.S. Cl.
CPC ........... H04B 7/2606 (2013.01); H04W 84/047 (2013.01)

(58) Field of Classification Search
None
See application file for complete search history.

(56) References Cited

U.S. PATENT DOCUMENTS

| | | | |
|---|---|---|---|
| 5,987,011 A * | 11/1999 | Toh | 370/331 |
| 2006/0056363 A1 | 3/2006 | Ratiu et al. | |
| 2006/0056368 A1 | 3/2006 | Ratiu et al. | |
| 2008/0025299 A1 * | 1/2008 | Agarwal et al. | 370/389 |
| 2008/0123579 A1 | 5/2008 | Kozat et al. | |
| 2008/0186950 A1 * | 8/2008 | Zhu et al. | 370/350 |
| 2008/0253299 A1 * | 10/2008 | Damm et al. | 370/252 |
| 2009/0318138 A1 * | 12/2009 | Zeng et al. | 455/431 |
| 2010/0157888 A1 | 6/2010 | Aggarwal et al. | |

FOREIGN PATENT DOCUMENTS

| | | |
|---|---|---|
| EP | 1271855 A1 | 1/2003 |
| EP | 1912450 A2 | 4/2008 |
| WO | WO-03/003670 A1 | 1/2003 |
| WO | WO-2006/078601 A2 | 7/2006 |

OTHER PUBLICATIONS

PCT/ISA/210—International Search Report—Oct. 11, 2010.
PCT/ISA/237—Written Opinion of the International Searching Authority—Oct. 11, 2010.
PCT/IPEA/409—International Preliminary Report on Patentability—Feb. 28, 2012.
PCT/IPEA/408—Written Opinion of the International Preliminary Examining Authority—Nov. 25, 2011.

(Continued)

*Primary Examiner* — Chirad Shah
*Assistant Examiner* — Joshua Smith
(74) *Attorney, Agent, or Firm* — Venable LLP; Eric J. Franklin

(57) ABSTRACT

Nodes, network and methods for communicating utilizing radio in a network including nodes. The method includes broadcasting from a center node, transmitting from a first primary peripheral node, and transmitting from an intermediate node to the center.

19 Claims, 12 Drawing Sheets

(56) References Cited

OTHER PUBLICATIONS

Gerhard Kramer et al.; "Cooperative Strategies and Capacity Theorems for Relay Networks", IEEE Transactions, Sep. 2005, vol. 51, No. 9, pp. 3037-3063.

Zhifeng Tao et al.; "Aggregation and Concatenation in IEEE 802.16j Mobile Multihop Relay (MMR) Networks," Mobile WiMAX Symposium, Mar. 2007, pp. 85-90.

Elisabeth Uhlemann et al.; "Scheduling Relay Nodes for Reliable Wireless Real-Time Communications," IEEE Conference on Emerging Technologies & Factory Automation, Sep. 2009, pp. 1-3, 22-25.

\* cited by examiner

| Channel 0 | C | I1 | I2 | I3 | I4 |
|---|---|---|---|---|---|
| Channel 1 | - | - | P11 | P12 | P13 |
| Channel 2 | - | P21 | - | P22 | P23 |
| Channel 3 | - | P31 | P32 | - | P33 |
| Channel 4 | - | P41 | P42 | P43 | - |

| Channel 0 | C | I1 | I2 | I3 | A01 | A02 |
| --- | --- | --- | --- | --- | --- | --- |
| Channel 1 | - | - | P11 | P12 | P13 | P14 |
| Channel 2 | - | P21 | - | P22 | P21 | P22 |
| Channel 3 | - | P31 | P32 | - | P33 | P34a |

| Channel 0 | C | I1 | I2 | I3 | A03 | A01 |
| --- | --- | --- | --- | --- | --- | --- |
| Channel 1 | - | - | P11 | P12 | P13 | P14 |
| Channel 2 | - | P21 | - | P22 | P21 | P22 |
| Channel 3 | - | P31 | P32 | - | P33 | P34b |

| Channel 0 | C | I1 | I2 | I3 | A02 | A03 |
| --- | --- | --- | --- | --- | --- | --- |
| Channel 1 | - | - | P11 | P12 | P13 | P14 |
| Channel 2 | - | P21 | - | P22 | P21 | P22 |
| Channel 3 | - | P31 | P32 | - | P33 | P34a | under 35 U.S.C. §371
METHOD IN WIRELESS NETWORK USING RELAYS

CROSS-REFERENCE TO RELATED APPLICATIONS

This application is the national phase under 35 U.S.C. §371 of PCT/SE2009/051277 filed 6 Nov. 2009.

FIELD OF THE INVENTION

The present invention relates to a method for communicating by means of radio in a network comprising nodes. Furthermore, the present invention relates to a network comprising nodes configured for communication by means of radio. Still further, the present invention furthermore relates to one or more nodes in a network configured for communication by means of radio. More specifically, the present invention may in particular be relevant for a network comprising nodes of communication, where the rate of information exchange is related to asymmetric capacity needs or hierarchic topologies.

BACKGROUND OF THE INVENTION

A problem of the prior art is radio related limitations concerning: delay, range/distance/coverage, capacity, or any combination thereof. The problem may depend on the allocated radio resources and the number of nodes.

SUMMARY OF THE INVENTION

An object of the invention is to solve the problems of the prior art.

According to the present invention, the above-mentioned and other advantages are achieved by provision of a method for communicating in a network. The network comprises first nodes, which may comprise a centre node, and may comprise at least one intermediate node that may include a first intermediate node, and may comprise at least one peripheral node that may include a first primary peripheral node. The method may comprise broadcasting from the centre node. The broadcasting from the centre node may include broadcasting to the first primary peripheral node and to at least one other node of the first nodes. The broadcasting from the centre node may be by means of radio. The broadcasting from the centre node may employ a primary time division multiple access scheme. The method may furthermore comprise transmitting from the first primary peripheral node to the first intermediate node. The transmitting from the first primary peripheral node to the first intermediate node may include transmitting first primary peripheral information. The transmitting from the first primary peripheral node to the first intermediate node may be by means of radio. The method may furthermore comprise transmitting from the first intermediate node to the centre node. The transmitting from the first intermediate node to the centre node may include transmitting first intermediate information. The transmitting from the first intermediate node to the centre node may be by means of radio. The transmitting from the first intermediate node to the centre node may employ the primary time division multiple access scheme. The first intermediate information may comprise at least part of the first primary peripheral information.

According to the present invention, the above-mentioned and other advantages are achieved by provision of a centre node configured for communication in a network. The network comprises first nodes, which may comprise the centre node, and may comprise at least one intermediate node that may include a first intermediate node, and may comprise at least one peripheral node that may include a first primary peripheral node. The communication may comprise broadcasting from the centre node. The broadcasting from the centre node may comprise broadcasting to the first primary peripheral node and to at least one other node of the nodes in the network. The broadcasting from the centre node may be by means of radio. The broadcasting from the centre node may employ a primary time division multiple access scheme. The communication may comprise receiving at the centre node first intermediate information from the first intermediate node. The receiving at the centre node may be by means of radio. The receiving at the centre node may employ the primary time division multiple access scheme. The first intermediate information may comprise at least part of first primary peripheral information received by the first intermediate node from the first primary peripheral node e.g. by means of radio.

According to the present invention, the above-mentioned and other advantages are achieved by provision of a first intermediate node configured for communication in a network. The network comprises first nodes, which may comprise a centre node, and may comprise at least one intermediate node that may include the first intermediate node, and may comprise at least one peripheral node that may include a first primary peripheral node. The communication may comprise receiving at the first intermediate node first primary peripheral information from the first primary peripheral node e.g. by means of radio. The communication may comprise transmitting at least part of the first primary peripheral information from the first intermediate node to the centre node e.g. by means of radio and e.g. by employing a first time division multiple access scheme.

According to the present invention, the above-mentioned and other advantages are achieved by provision of a first primary peripheral node configured for communication in a network. The network comprises first nodes, which may comprise a centre node, and may comprise at least one intermediate node that may include an intermediate node, and may comprise at least one peripheral node that may include the first primary peripheral node. The communication may comprise receiving at the first primary peripheral node broadcast information from e.g. the centre node e.g. by means of radio. The communication may comprise transmitting first primary peripheral information to the first intermediate node e.g. by means of radio.

At least two selected from a group comprising, the centre node, the at least one intermediate node, and the at least one peripheral node may according to the present invention be combined in a communication network configured for communication.

An advantage of the invention lies in reducing or avoiding unnecessary transmission of identical data, and optionally in organizing the use of radio channels in relation to physical limitations of the radio resources, that may result in timing constraints. The latter enabling a reduction in number of slots required with respect to the multiple nodes.

An advantage of the present invention is that a communication network having an improved range and/or coverage area is achieved. This may achieved by exploiting the asymmetry in node characteristics with respect to output power, sensitivity and/or transmit/receive antenna directivity in the directions in the event that this favours the direction relevant for broadcast information.

Another advantage of the present invention is that a communication network having less delay is achieved. This may achieved by utilizing the extended range opportunity that broadcast offers to send information directly to the nodes and thus to avoid any intermediate nodes and corresponding delay or the jitter that may as mentioned above result from an unpredictable number of hops.

Another advantage of the present invention is that a communication network having an improved capacity and/or channel accessibility is achieved. This may achieved by enabling a communication forwarding scheme with lesser slots at the centre node, thereby benefitting from the increase in throughput as discussed above and exploiting the opportunity with co-ordinated radio channels.

Yet another advantage of the present invention is that a communication network having a reduced need for radio equipment and/or having a reduced complexity is achieved.

This may achieved by an optimized and co-ordinated TDMA scheme that enables a high degree of resource utilization (duty factor) instead of employing multiple transceivers or radio equipment.

Still another advantage of the present invention is that a communication network having a possibility of alternative communication pathways is achieved. This may achieved by allowing the above mentioned communication network to be reconfigured to allow for a peripheral node to connect via another intermediate node, then potentially obtaining optimum connectivity with respect to the propagation conditions.

Further advantages of the invention are a simple implementation and/or reduction of cost and/or a reduced level of performance requirements that may be a result from a reduction of radio equipment as explained above, or may be a result from exploiting the diametric alternatives to the delay or capacity advantages explained above, i.e. a potential total increase in throughput per radio channel of output power, lower requirement on synchronization time etc.

Other advantages of the invention are a reduced effort on e.g. initial synchronization per information received by e.g. the centre node, and thus more efficient use of the network. This may be as a result from the reduction of radio equipment as explained above, or a result of exploiting the diametric alternatives to the delay or capacity advantages explained above, i.e. potential reduction of output power, lower requirement on synchronization time etc.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

The figures are schematic and simplified for clarity, and they may merely show details which are essential to the understanding of the invention, while other details may have been left out. Throughout, the same reference numerals are used for identical or corresponding parts.

Figure 1:
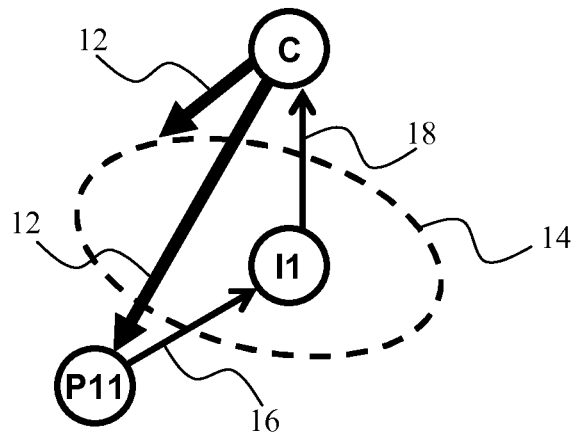
FIG. 1 schematically illustrates a communication diagram illustrating nodes and a method according to the present invention for communicating in a network comprising the nodes, FIGS. 2-5 schematically illustrate embodiments according to the present invention, FIGS. 6-7 schematically illustrate sequence diagrams illustrating communication from nodes in the embodiment illustrated in FIG. 5, FIG. 8 schematically illustrates that an intermediate node may comprise sub intermediate nodes, FIGS. 9-11 schematically illustrate embodiments according to the present invention, FIGS. 12-13 schematically illustrate an embodiment according to the present invention, FIGS. 14-16 schematically illustrate channel allocation diagrams for communication from nodes in the embodiment illustrated in FIG. 12, FIG. 17 schematically illustrates an embodiment according to the present invention, FIG. 18 schematically illustrates a channel allocation diagram illustrating communication from nodes in the embodiment illustrated in FIG. 17, FIG. 19 schematically illustrates an embodiment according to the present invention, FIG. 20 schematically illustrates a communication table illustrating communication from nodes in the embodiment illustrated in FIG. 19, FIG. 21 schematically illustrates an embodiment according to the present invention, FIG. 22 schematically illustrates a communication table illustrating communication from nodes in the embodiment illustrated in FIG. 21, and FIG. 23 schematically illustrates a communication diagram illustrating nodes and a method according to the present invention for communicating in a network comprising the nodes.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and sufficient, and will fully convey the concept of the invention to those skilled in the art.

DETAILED DESCRIPTION

The invention may address a real time networking application. The network may comprise a centre node and a number of subordinate nodes, such as peripheral nodes and intermediate nodes.

A solution that addresses a need for radio networking with broadcasting capability may be established by combining technologies for multiple access and radio networking. The solution may be particularly relevant for point-to-multipoint topologies or other topologies where a certain portion of information shall be sent to multiple nodes, although not necessarily within an entire network of nodes. The solution may enable the use of limited radio resources throughout the network by co-ordinating the multiple access schemes of the radio channels. The delay and total capacity within the network can thus be optimized by effectively increasing the degree of radio resource utilization. A point-to-multipoint topology constitutes a good example, comprising a centre node and a number of subordinate nodes. Such a topology would open up for a novel scheme where the information to be received by the centre node could be concentrated in fewer slots (or the corresponding for multiple access schemes based on other methods than TDMA) than the total number of nodes (as compared to a traditional scheme with a minimum of one slot per subordinate node). The concentration of information would thus improve capacity as the "overhead" would become comparatively lesser.

Such a scheme would be feasible by dividing the capacity between broadcast and networking according to a tiered topology that divides the subordinate nodes into intermediate nodes and peripheral nodes on different levels, wherein the intermediate nodes may forward information from peripheral nodes and concentrating this into certain slots. Such concentration forwarding techniques could be employed by any of the subordinate nodes in order to eliminate the need for dedicated resources (special forwarding nodes). Hence, an intermediate node can be a subordinate node that also transmits its own information to the centre node. All nodes may be capable of concentration forwarding, which may require higher utilization (duty) of radio resources, i.e. transmitter channels, receiver channels etc. Concentration forwarding may e.g. refer to a situation were one node, e.g. an intermediate node forwards at least part of the information from one or more other nodes towards the centre node. The forwarding of information by an intermediate node may include adding information from e.g. the intermediate node itself to the information to be forwarded towards the centre node.

In essence, the utilization (duty) of the physical radio resources may be increased for some of the nodes in order to improve total capacity (overall throughput) within the network while maintaining low delay.

From a radio perspective, this would be equally feasible for a scenario with geographically dispersed subordinate nodes and a scenario where all nodes are distributed along a perimeter such as for example a circle, although both scenarios would of course still require that subordinate nodes are within reasonable distance form the centre node.

In addition to the above, immediate access capability may be ensured by a conflict free access scheme involving a predetermined number of slots, in contrast to a conflict resolving random access scheme. This may be relevant in order to guarantee a maximum worst case response time for the application, corresponding to the access delay of the access scheme. The access scheme however does not prevent the allocation of slots from being organized in an optimum way from a connectivity perspective. Nor does it exclude conflict resolving access mechanisms to allow for a dynamic number of nodes.

The predetermined networking capacity and relation to the broadcasting capacity as well as the number of slots may in many ways be optimized with respect to capacity and delay.

In a point-to-multipoint topology, a solution based on the invention could employ a certain number of intermediate nodes between the centre node and peripheral nodes, whereby the intermediate nodes may also act as subordinate nodes (i.e. from an application and data communication perspective).

For some use cases, the employment of intermediate nodes would further open up for the possibility of extending range to a major part of the subordinate nodes. This would be possible for a use case with asymmetric link budgets, which would be the case when a centre node utilizes vehicle mounted radio equipment with higher transmit power and the peripheral nodes are equipped with portable radio equipment with lower transmit power sensitivity threshold.

The centre node may send data (information) to all subordinate nodes, where a part of this data, e.g. most of the data, may be identical for all subordinate nodes, i.e. broadcast data. This data may be subject to very stringent delay requirements.

Each subordinate node may send data to the centre node. This data may be less sensitive to delay, but nevertheless require periodic update at a required rate.

The solution may build on concentration forwarding for information sent from subordinate nodes towards the centre node.

The performance of the application may be sensitive with respect to validity of data and to the precision of the transferred data relating to the dynamic properties of communicated data (which e.g. may concern high speed moving objects).

The solution may be based on multiple radio channels with a common predefined interval for broadcast data and other time intervals for information sent from subordinate nodes, the latter in turn divided into slots. The different nodes may employ a combination of radio channels in order to establish a co-ordinated scheme of broadcast and concentration forwarding based on time division multiple access (TDMA).

Frequency hopping radio techniques may be employed.

All radio channels may be organized according to the same TDMA scheme with one broadcast interval and four networking slots, although preferably only the centre node transmits in the broadcast interval.

The centre node may employ one channel, e.g. a primary radio channel, for transmission in the broadcasting interval and for reception from one or more intermediate nodes (or concentration nodes) in the networking slots. The reception from the one or more intermediate nodes may contain concentrated information from one or more associated nodes (peripheral nodes) and may include information from the intermediate node itself.

Each intermediate node may employ the primary radio channel for reception in its broadcast interval and for transmission in one of its networking slots. In the remaining network slots, the intermediate node utilizes a secondary radio channel for reception of information from peripheral nodes to be forwarded.

Each peripheral node may employ the primary radio channel for reception in a broadcast interval. In one of the remaining network slots, the peripheral node may utilize a secondary radio channel of an appropriate intermediate node (i.e. e.g. the channel of an associated intermediate node) for transmission of information to be forwarded to the centre node.

For geographically dispersed scenarios, a scheme could be made more spectrum efficient e.g. by utilizing the same radio channel simultaneously at different nodes. Thus, it may be an advantage to employ one or more techniques for channel separation to reduce the risk for interference. Employed techniques for channel separation may include: directive antennas, spread spectrum techniques, slot reuse algorithms, frequency allocation schemes, etc., or any combination thereof.

In a scenario based on radio links with asymmetric range performance, the maximum distance between centre node and peripheral node could be improved by allowing the most peripheral nodes to reach back to the centre node by means of concentration forwarding. Hence, while still being reached directly by transmission from the centre node, the only way for transmissions to reach the centre node would be via an intermediate node.

This way a typical range increase of 40% to the farthest peripheral nodes may be possible (corresponding to double coverage area). The increase in range for this data communication solution may also be better in line with the range of voice communication over radio (maybe without intermediate nodes), which generally may exhibit a range performance superior to that of data communication.

Alternative or combined approaches may be employed to optimize e.g. the different paths with respect to bit rate, e.g. when a higher data rate is used for information transmitted to superior levels.

Asymmetric range performance may be a result from difference in output power (which might very well be the case in a point-to-multipoint topology where subordinate units might only be equipped with portable radios while the centre node may host an integrated radio with special power amplifier.

Asymmetric range performance may also result from difference in required signal level at the receiver. This may result from differences in modulation or baseband bit rate or from noise level at the receiver. The latter may be relevant for the centre node, which often is more likely to be subject to collocation interference due to multiple installed radio equipment.

Instead of or combined with optimizing the communication with respect to number of radio channels, the spare slots (e.g. such as those marked with a hyphen in the following examples illustrating TDMA schemes) could be used for control of the TDMA scheme or for communication between peripheral nodes. Likewise, radio channels may be added for various reasons.

A TDMA control approach may be employed to determine the best hierarchical structure through collection of information about connectivity between all available nodes, possibly also including signal quality estimate for each connection in order to judge which paths are most suitable to employ. The connectivity for each networking slot and interval may hence be probed, transferring TDMA control data at the same time to all other nodes within range.

A specific TDMA control interval may be introduced in a TDMA cycle. In order to provide slots for all subordinate nodes, the allocation to this interval should use a schedule to be repeated after an (e.g. predetermined) number of TDMA cycles, and thus that the TDMA control interval could periodically be allocated to each of the subordinate nodes. It could also be relevant to extend this schedule with additional TDMA cycles to enable a random access mechanism to support dynamic network reconfiguration. Possible random access alternatives include variants of CSMA (Carrier Sense Multiple Access).

The TDMA control interval and the broadcast interval may be used for connectivity probing as well as for transfer of connectivity data. The broadcast interval would in addition be used to transfer the allocation of TDMA control slots, should this be deemed necessary.

The centre node may be able to transmit information over longer distances than a peripheral node. Thus, a centre node may be able to transmit information to a peripheral that can only transmit to the centre node through an intermediate node.

Communication by radio may include any electromagnetic communication. Alternative or additionally, it may include photonic or sonic communication means.

Communication may be carried out within one or more channels. A channel may define a frequency interval or range within which interval or range communication from a node may be carried out. The frequency interval or range for a channel may be fixed or it may be variable/adaptive, e.g. according to a certain order of defined parameters or to information about parameters received from e.g the centre node. The frequency interval or range for a channel may change randomly or (pseudo-randomly) over time.

A time division multiple access scheme comprises a number of time slots allocated to nodes for transmission/broadcasting within the allocated slot/slots. The scheme may repeat itself after a TDMA cycle has passed.

The at least one intermediate node may include any number of intermediate nodes, such as at least 2, 3, 4, 5, 10, or 20 intermediate nodes. The at least one peripheral node may include any number of peripheral nodes, such as at least 4, 6, 10, 20, or 50 peripheral nodes.

The invention may support multicasting (i.e. transmission of identical data to a selected number of nodes) and may be combined with regular forwarding and/or rebroadcasting if relevant, most of which will rely on adequate co-ordination of radio channels. Rebroadcasting may include broadcasting specific information again, e.g. on request from a subordinate node.

The invention may include a forwarding scheme that is used to concentrate information sent from multiple nodes via intermediate nodes. This scheme may involve multiple radio channels and may also be combined with direct broadcasting directly from one node to other nodes (not employing intermediate nodes). The co-ordination of the radio channels may be carried out by means of multiple access principles e.g. TDMA and/or CDMA. The co-ordinated use of multiple radio channels may enable broadcast to co-exist with simultaneous transmissions performed by other nodes.

The invention may apply to multiband radio solutions, i.e. where the radio resources provide access to multiple radio bands. The invention may enable various scaling opportunities by adding multiple radio transmitters or receivers of the same kind.

The invention may provide network having different paths for different information transfer directions.

Co-ordination of radio channels may be achieved through multiple access schemes.

The invention may comprise a combination of broadcasting and networking. The invention may be used for point-to-multipoint topologies.

The invention may provide support for asymmetric data exchange rate.

Transmitting first primary peripheral information may be carried out by employing a first secondary time division multiple access scheme that may be synchronized with the primary time division multiple access scheme.

Transmitting first primary peripheral information may be carried out by employing the primary time division multiple access scheme.

Broadcasting from the centre node may comprise broadcasting to the first intermediate node. The centre node may send information to individual nodes and/or to groups of individual nodes.

The first intermediate information may comprise information which is derived at the first intermediate node. Information derived at an intermediate node may mean that the information is not resulting from information received from a peripheral node and/or it may mean that the information is derived at the intermediate node based on instructions in the broadcast information to e.g. retrieve specific data at the intermediate node.

The at least one peripheral node may comprise a second primary peripheral node and broadcasting from the centre node may comprise broadcasting to the second primary peripheral node. In addition, the method may comprise transmitting second primary peripheral information from the second primary peripheral node to the first intermediate node by means of radio, and the first intermediate information may comprise at least part of the second primary peripheral information.

The at least one intermediate node may include a second intermediate node, and the at least one peripheral node may include a first secondary peripheral node, and broadcasting from the centre node may comprise broadcasting to the first secondary peripheral node. In addition, the method may comprise transmitting first secondary peripheral information from the first secondary peripheral node to the second intermediate node e.g. by means of radio, and may comprise transmitting second intermediate information from the second intermediate node to the centre node e.g. by means of radio and e.g. by employing the primary time division multiple access scheme.

In addition, the second intermediate information may comprise at least part of the first secondary peripheral information. Broadcasting from the centre node may comprise broadcasting to the second intermediate node. The second intermediate information may comprise information which is derived at the second intermediate node.

Transmitting first secondary peripheral information may be carried out by employing a second secondary time division multiple access scheme that may be synchronized with the primary time division multiple access scheme.

Transmitting first secondary peripheral information may be carried out by employing the primary time division multiple access scheme.

A combination of multiple radio channels (or radio channels) may be employed for any transmitting and/or broadcasting.

It may be advantageous that the transmission/broadcast from the different nodes is synchronized. Thus, if using multiple radio channels, it may be advantageous that they are co-ordinated. Multiple access principles such as frequency division multiple access (FDMA), code division multiple access (CDMA), antenna sectorization, spatial spectrum reuse principles, etc., or any combination of the mentioned may be used. Advantageous combinations may be any of the following multiple access techniques: TDMA and CDMA; TDMA and FDMA; CDMA and FDMA; TDMA, CDMA and FDMA.

Any of the mentioned combinations of multiple access principles may be combined with antenna sectorization, and/or spatial spectrum reuse principles, etc.

Spatial division may be based on directive antennas. Directive antennas may be used to complement other multiple access principles by enabling multiple transmissions and/or receptions at one node and by enabling multiple nodes to reuse frequencies simultaneously. Spatial division based on orthogonal polarization may provide limited advantage due to that a maximum of two polarizations may be orthogonal at the same time, regardless of whether linear or circular polarization is used. Orthogonal polarization may be used to complement other multiple access principles by providing simultaneous transmission and/or reception.

A channel may be reused if enough separation can be obtained (time, distance, frequency, code, antenna gain, polarization, etc). Separation in time can be enabled if e.g. data is compressed into short bursts etc.

A first secondary radio channel may be employed for transmitting from the first primary peripheral node, and a second secondary radio channel may be employed for transmitting from the first secondary peripheral node.

A centre radio channel may be employed for broadcasting from the centre node. The centre radio channel may be employed for transmitting from the first intermediate node. The centre radio channel may be employed for transmitting from the second intermediate node.

At least one radio channel selected from a group comprising the first secondary radio channel, the second secondary radio channel, and/or the centre radio channel may employ at least one multiple access principle selected from a group comprising FDMA, CDMA, Spatial Division, and Antenna sectorization.

The first intermediate node may comprise sub intermediate nodes that may include a first primary sub intermediate node and a second primary sub intermediate node. Accordingly, transmitting first primary peripheral information from the first primary peripheral node to the first intermediate node may comprise transmitting first primary peripheral information from the first primary peripheral node to the first primary sub intermediate node. Transmitting first intermediate information from the first intermediate node to the centre node may comprise transmitting first intermediate information from the second primary sub intermediate node to the centre node. The method may comprise transmitting primary sub intermediate information comprising at least part of the first primary peripheral information from the first primary sub intermediate node to the second primary sub intermediate node. Broadcasting from the centre node may comprise broadcasting to the first primary sub intermediate node. Broadcasting from the centre node may comprise broadcasting to the second primary sub intermediate node. The first intermediate information may comprise at least part of the primary sub intermediate information. The first intermediate information may comprise at least part of the first primary peripheral information.

A sub intermediate node may itself comprise a number of sub intermediate nodes e.g. as explained above in connection with an intermediate node.

Information sent from a peripheral node may arrive to the centre node through any number of intermediate nodes or sub intermediate nodes (such as 1, 2, 3, 4, 5, or more).

A network operating according to the present invention may at least for a period be static, i.e. the communication sequence/scheme is fixed. However, for embodiments, an additional node may join the network if available slots exist and/or if a new communication sequence/scheme is provided.

A secondary multicast interval could be introduced in order to establish rebroadcast for further range increase or to support information transmission from intermediate nodes to peripheral nodes.

FIG. 1 schematically illustrates a communication diagram illustrating first nodes and a method according to the present invention for communicating in a network comprising the first nodes. The first nodes comprise a centre node (C), at least one intermediate node including a first intermediate node (I1), and at least one peripheral node including a first primary peripheral node (P11). The method comprises broadcasting 12 from the centre node (C). The broadcasting 12 from the centre node is adapted to reach the first primary peripheral node (P11) and at least one other node 14 of the first nodes. The circle with a broken line 14, which encloses the first intermediate node (I1), indicates that the at least one other node 14 of the first nodes may be any of the first nodes exclusive of the centre node (C) and the first primary peripheral node (P11). The broadcasting 12 is e.g. by means of radio. The broadcasting 12 employs e.g. a primary time division multiple access scheme. The method comprises transmitting first primary peripheral information 16 from the first primary peripheral node (P11) to the first intermediate node (I1). The transmission of the first primary peripheral information 16 is e.g. by means of radio. The method comprises transmitting first intermediate information 18 from the first intermediate node (I1) to the centre node (C). The transmission of the first intermediate information 18 is e.g. by means of radio. The transmission of the first intermediate information 18 employs e.g. the primary time division multiple access scheme. Furthermore, the first intermediate information 18 comprises e.g. at least part of the first primary peripheral information 16. Transmitting first primary peripheral information 16 may be carried out by employing a first secondary time division multiple access scheme that is synchronized with the primary time division multiple access scheme. Alternatively or additionally, transmitting first primary peripheral information 16 may be carried out by employing the primary time division multiple access scheme.

Figure 2:
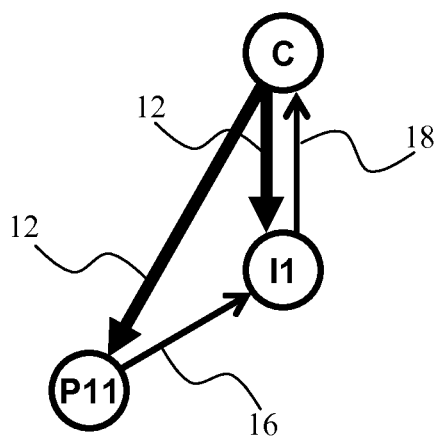

FIG. 2 schematically illustrates an embodiment according to the present invention, e.g. based on the method and nodes illustrated in FIG. 1, wherein broadcasting 12 from the centre node (C) to the at least one other node of the first nodes comprises broadcasting 12 to the first intermediate node (I1). Furthermore, the first intermediate information 18 may comprise information which is derived at the first intermediate node (I1).

Figure 3:
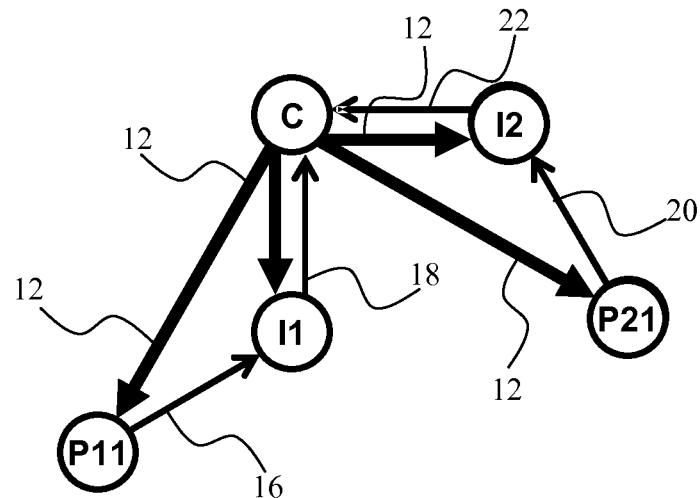

FIG. 3 schematically illustrates an embodiment according to the present invention, e.g. based on the method and nodes illustrated in FIG. 1, wherein, in addition to what is illustrated in FIG. 2, the at least one intermediate node includes a second intermediate node (I2), and wherein the at least one peripheral node includes a first secondary peripheral node (P21), and wherein broadcasting 12 from the centre node (C) comprises broadcasting 12 to the first secondary peripheral node (P21) and to the second intermediate node (I2). The method illustrated in FIG. 3 furthermore comprises transmitting first secondary peripheral information 20 from the first secondary peripheral node (P21) to the second intermediate node (I2), e.g. by means of radio. The method illustrated in FIG. 3 furthermore comprises transmitting second intermediate information 22 from the second intermediate node (I2) to the centre node (C), e.g. by means of radio and e.g. by employing the primary time division multiple access scheme. The second intermediate information 22 comprises e.g. at least part of the first secondary peripheral information 20. Transmitting first secondary peripheral information 20 may be carried out by employing a second secondary time division multiple access scheme that is synchronized with the primary time division multiple access scheme. Alternatively or additionally, transmitting first secondary peripheral information 20 may be carried out by employing the primary time division multiple access scheme.

Figure 4:
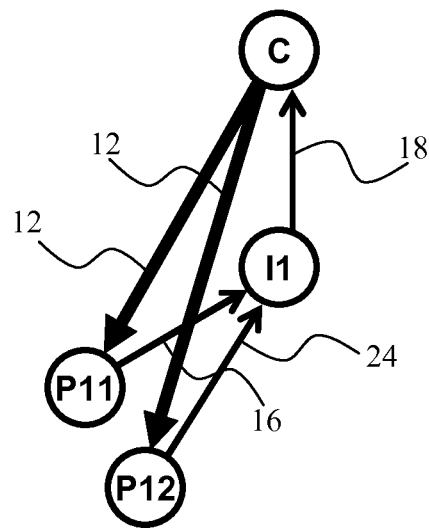

FIG. 4 schematically illustrates an embodiment according to the present invention, e.g. based on the method and nodes illustrated in FIG. 1, wherein the at least one peripheral node comprises a second primary peripheral node (P12), and wherein broadcasting 12 from the centre node (C) comprises broadcasting 12 to the second primary peripheral node (P12). The method furthermore comprises transmitting second primary peripheral information 24 from the second primary peripheral node (P12) to the first intermediate node (I1), e.g. by means of radio. The first intermediate information 18 comprises e.g. at least part of the second primary peripheral information 24.

Figure 5:
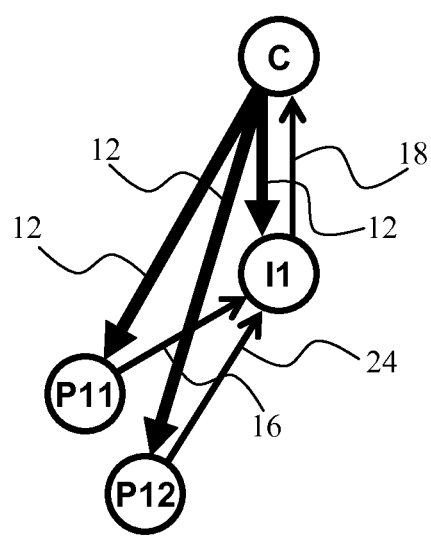

FIG. 5 schematically illustrates an embodiment according to the present invention, e.g. based on the method and nodes illustrated in FIG. 1, wherein, in addition to what is illustrated in FIG. 4, broadcasting from the centre node (C) comprises broadcasting to the first intermediate node (I1), and wherein the first intermediate information 18 may comprise information which is derived at the first intermediate node (I1).

Figure 6:
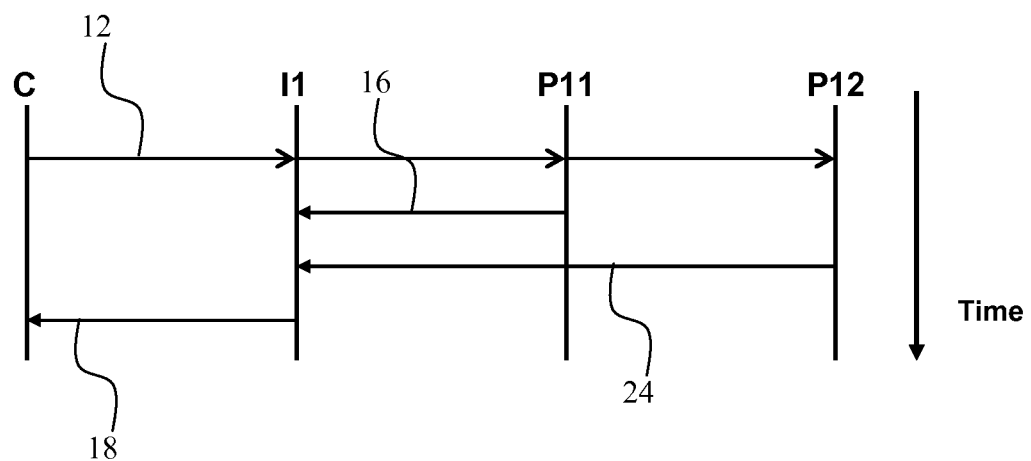

FIG. 6 schematically illustrates a sequence diagram illustrating communication from nodes of the embodiment illustrated in FIG. 5. The time-axis indicates that time progresses downwards. The upper horizontal arrow 12 from C to I1, P11, and P12 indicates the broadcasting 12 from the centre node (C) to the first intermediate node (I1), the first primary peripheral node (P11), and the second primary peripheral node (P12). The arrow 16 from P11 to I1 indicates the transmission of first primary peripheral information 16 from the first primary peripheral node (P11) to the first intermediate node (I1). The arrow 24 from P12 to I1 indicates the transmission of second primary peripheral information 24 from the second primary peripheral node (P12) to the first intermediate node (I1). The arrow 18 from I1 to C indicates the transmission of first intermediate information 18 from the first intermediate node (I1) to the centre node (C). The illustrated sequence (and/or any other sequence, e.g. illustrated in following figures) may be repeated, e.g. for a predetermined or an adaptive limited period, e.g. adapted to the amount of information to be broadcasted.

Figure 7:
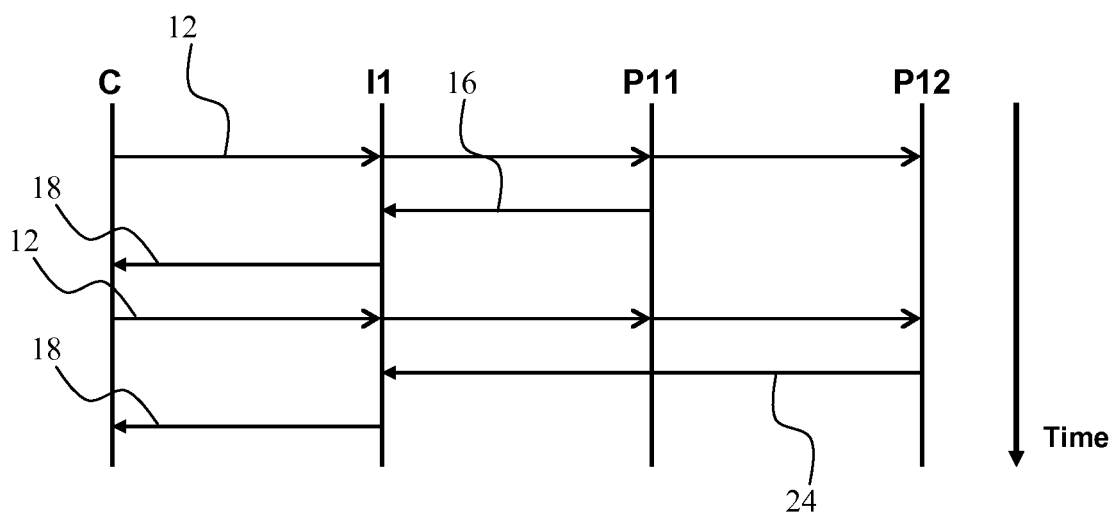

FIG. 7 schematically illustrates a sequence diagram illustrating communication from nodes in the embodiment illustrated in FIG. 5. The time-axis indicates that time progresses downwards. The upper horizontal arrow 12 from C to I1, P11, and P12 indicates the broadcasting 12 from the centre node (C) to the first intermediate node (I1), the first primary peripheral node (P11), and the second primary peripheral node (P12). The arrow 16 from P11 to I1 indicates the transmission of first primary peripheral information 16 from the first primary peripheral node (P11) to the first intermediate node (I1). The upper arrow 18 from I1 to C indicates the transmission of first intermediate information 18 from the first intermediate node (I1) to the centre node (C). The intermediate information 18 may e.g. comprise at least part of the information 16. The lower horizontal arrow 12 from C to I1, P11, and P12 indicates the broadcasting 12, e.g. another broadcasting sequence, from the centre node (C) to the first intermediate node (I1), the first primary peripheral node (P11), and the second primary peripheral node (P12). The arrow 24 from P12 to I1 indicates the transmission of second primary peripheral information 24 from the second primary peripheral node (P12) to the first intermediate node (I1). The lower arrow 18 from I1 to C indicates the transmission of first intermediate information 18 from the first intermediate node (I1) to the centre node (C). The intermediate information 18 may e.g. comprise at least part of the information 24. The illustrated sequence may be repeated.

Figure 8:
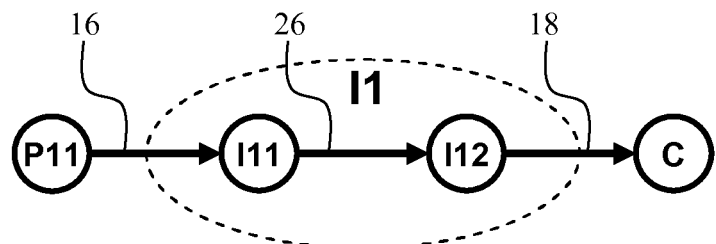

FIG. 8 schematically illustrates that, for any embodiment according to the present invention, an intermediate node, such as the first intermediate node (I1) as illustrated in FIG. 8, may comprise sub intermediate nodes. In the illustrated example, the first intermediate node (I1) comprises sub intermediate nodes including a first primary sub intermediate node (I11) and a second primary sub intermediate node (I12). Transmitting first primary peripheral information 16 from the first primary peripheral node (P11) to the first intermediate node (I1) comprises transmitting first primary peripheral information 16 from the first primary peripheral node (P11) to the first primary sub intermediate node (I11). Transmitting first intermediate information 18 from the first intermediate node (I1) to the centre node (C) comprises transmitting first intermediate information 18 from the second primary sub intermediate node (I12) to the centre node (C). The method comprises transmitting primary sub intermediate information 26 comprising at least part of the first primary peripheral information 16 from the first primary sub intermediate node (I11) to the second primary sub intermediate node (I12). The first intermediate information 18 comprises at least part of the primary sub intermediate information 26 and at least part of the first primary peripheral information 16.

Figure 9:
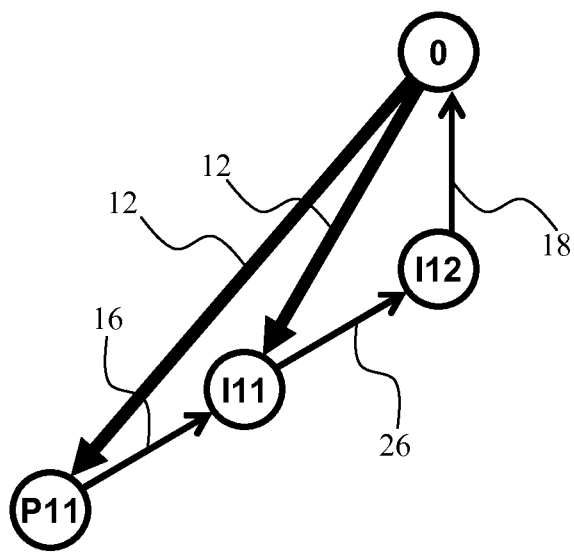

FIG. 9 schematically illustrates an embodiment according to the present invention, e.g. based on the method and nodes illustrated in FIG. 1, wherein, as explained in connection with FIG. 8, the first intermediate node (I1) comprises sub intermediate nodes including a first primary sub intermediate node (I11) and a second primary sub intermediate node (I12). As further illustrated in FIG. 9, broadcasting 12 from the centre node (C) comprises broadcasting 12 to the first primary sub intermediate node (I11).

Figure 10:
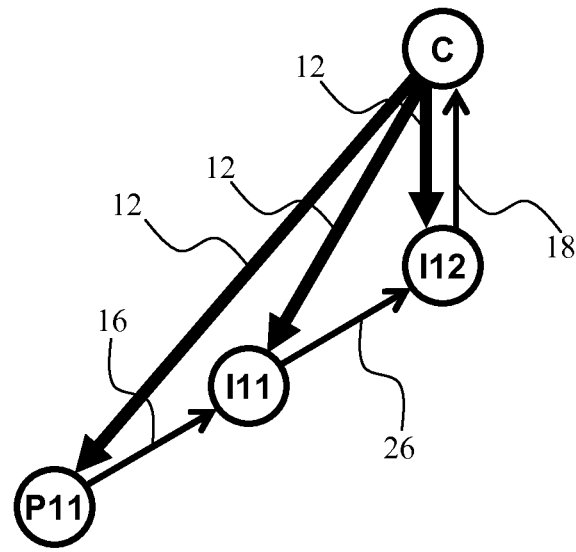

FIG. 10 schematically illustrates a situation similar to that of FIG. 9. In FIG. 10, the broadcasting 12 from the centre node (C) comprises broadcasting 12 to both the first primary sub intermediate node (I11) and to the second primary sub intermediate node (I12).

Figure 11:
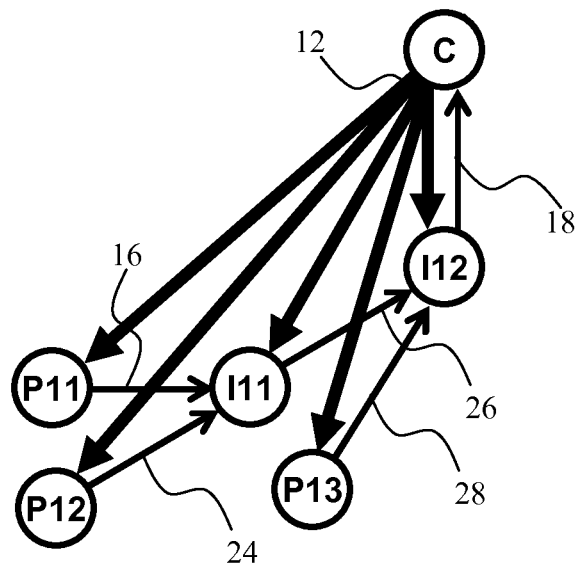

FIG. 11 schematically illustrates an embodiment according to the present invention, wherein the nodes I11 and I12 are sub intermediate nodes for the first primary peripheral node (P11) as illustrated in connection with FIGS. 8-10. The embodiment in FIG. 11 includes a second primary peripheral node (P12) that is adapted to use I11 and I12 as sub intermediate nodes. However, for a third primary peripheral node (P13), the corresponding intermediate node includes I12, but does not include I11. Thus, FIG. 11 schematically illustrates that a node, such as the illustrated third primary peripheral node (P13), may transmit 28 directly to a node, such as the illustrated node I12, which acts as a sub intermediate node for some peripheral nodes (i.e. for P11 and P12) and acts as an non-sub intermediate node for another node (i.e. for P13), i.e. I12 receives information 28 directly from P13 and transmits information 18 directly to the centre node (C).

Figure 12:
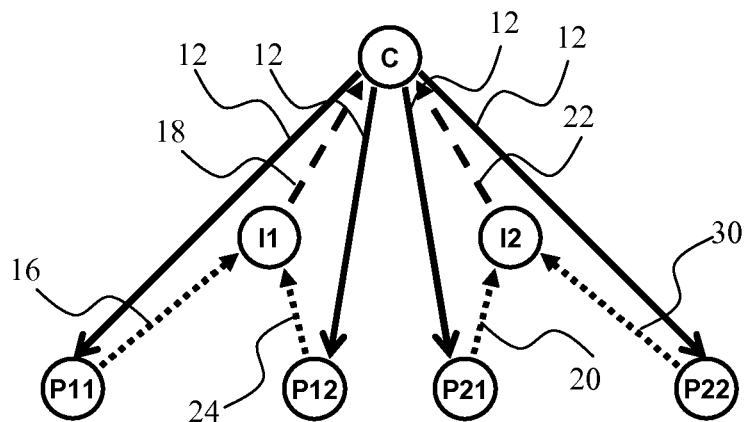

FIG. 12 schematically illustrates an embodiment according to the present invention, e.g. based on the method and nodes illustrated in FIG. 1. FIG. 12 schematically illustrates a communication diagram illustrating first nodes and a method according to the present invention for communicating in a network comprising the first nodes. The first nodes comprise a centre node (C), a first intermediate node (I1), a second intermediate node (I2), a first primary peripheral node (P11), a second primary peripheral node (P12), a first secondary peripheral node (P21), and a second secondary peripheral node (P22). The method comprises broadcasting 12 from the centre node (C). The broadcasting 12 from the centre node is adapted to reach e.g. at least the first primary peripheral node (P11), the second primary peripheral node (P12), the first secondary peripheral node (P21), and the second secondary peripheral node (P22). The method comprises transmitting information 16 from the first primary peripheral node (P11) to the first intermediate node (I1). The method comprises transmitting information 24 from the second primary peripheral node (P12) to the first intermediate node (I1). The method comprises transmitting information 20 from the first secondary peripheral node (P21) to the second intermediate node (I2). The method comprises transmitting information 30 from the second secondary peripheral node (P22) to the second intermediate node (I2). The method comprises transmitting first intermediate information 18 from the first intermediate node (I1) to the centre node (C). The first intermediate information 18 comprises e.g. at least part of the first primary peripheral information 16 and e.g. at least part of the second primary peripheral information 24. The method comprises transmitting second intermediate information 22 from the second intermediate node (I2) to the centre node (C). The second intermediate information 22 comprises at least part of the first secondary peripheral information 20 and at least part of the second secondary peripheral information 30.

Figure 13:
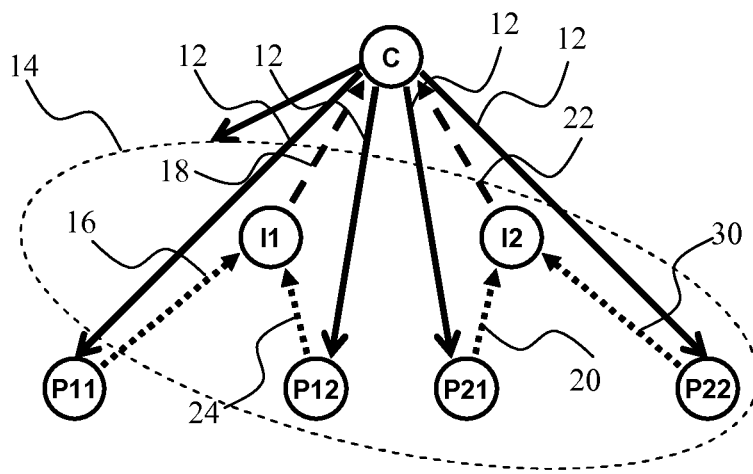

In FIG. 13 the at least one other node 14 of the first nodes, as referred to in connection with FIG. 1, is indicated by the a circle with a broken line 14, which encloses I1, I2, P12, P21, and P22. This indicates that the at least one other node 14 of the first nodes may be any of the first nodes exclusive of the centre node (C) and the first primary peripheral node (P11).

Figure 14:
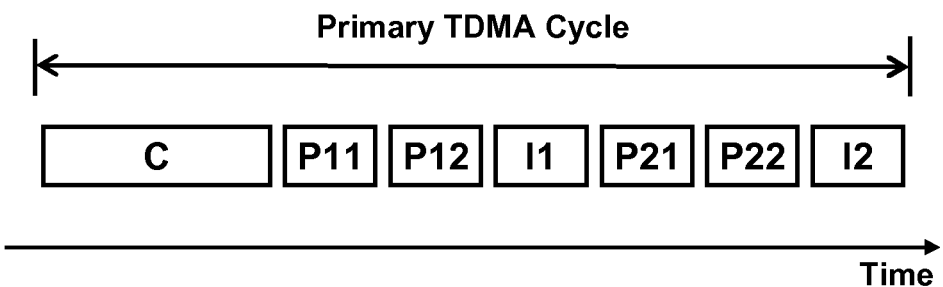
Figure 15:
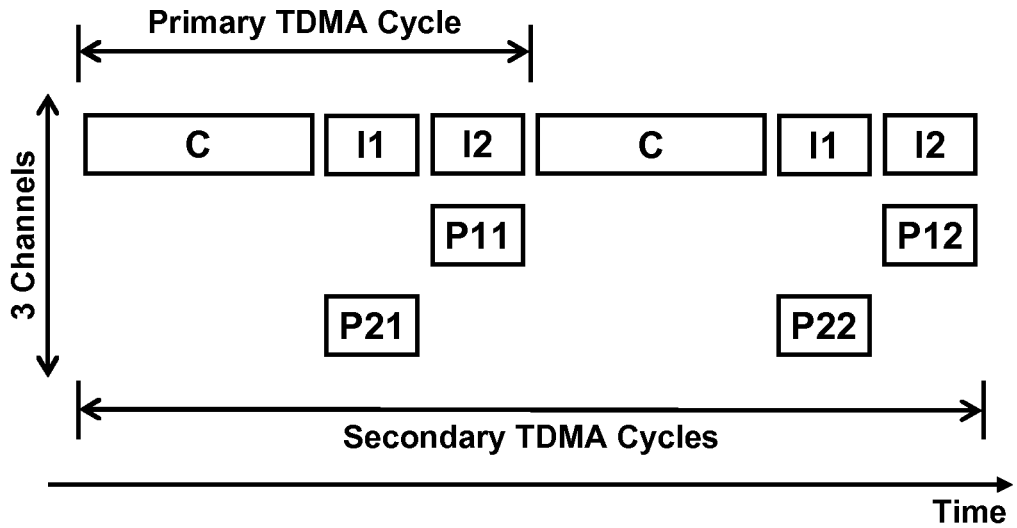
Figure 16:
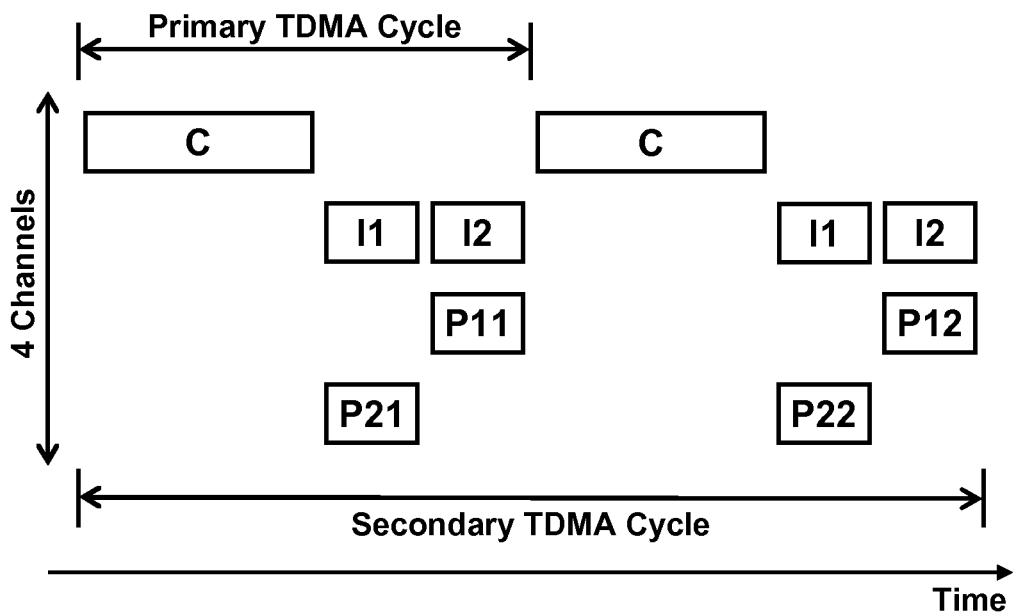

FIGS. 14-16 schematically illustrate channel allocation diagrams illustrating communication from nodes in the embodiment illustrated in FIG. 12. The tables illustrate examples of allocated time slots for three different situations. For FIGS. 14-16 time progresses from left to right. An allocated time slot to a node, indicated by a reference to a node illustrated in FIG. 12, indicates that that particular node is broadcasting or transmitting at the indicated time slot.

For the situation illustrated in FIG. 14, a single radio channel is employed. The cycle repeats itself after a "Primary TDMA Cycle" has passed.

For the situation illustrated in FIG. 15, three radio channels are employed. A first secondary radio channel is employed for transmitting from the first primary peripheral node (P11) and from the second primary peripheral node (P12). A second secondary radio channel is employed for transmitting from the first secondary peripheral node (P21), and from the second secondary peripheral node (P22). A centre radio channel is employed for broadcasting from the centre node (C), for transmitting from the first intermediate node (I1), and for transmitting from the second intermediate node (I2). The period, within which the transmit/broadcast sequence repeat itself, is for the centre radio channel denoted the "Primary TDMA Cycle", and for the first secondary radio channel and the second secondary radio channel denoted "Secondary TDMA Cycle".

For the situation illustrated in FIG. 16, four radio channels are employed. A first secondary radio channel is employed for transmitting from the first primary peripheral node (P11) and from the second primary peripheral node (P12). A second secondary radio channel is employed for transmitting from the first secondary peripheral node (P21), and from the second secondary peripheral node (P22). A centre radio channel is employed for broadcasting from the centre node (C). A primary radio channel is employed for transmitting from the first intermediate node (I1), and for transmitting from the second intermediate node (I2). The period, within which the transmit/broadcast sequence repeat itself, is for the centre radio channel and for the primary radio channel denoted the "Primary TDMA Cycle", and for the first secondary radio channel and the second secondary radio channel denoted "Secondary TDMA Cycle".

Figure 17:
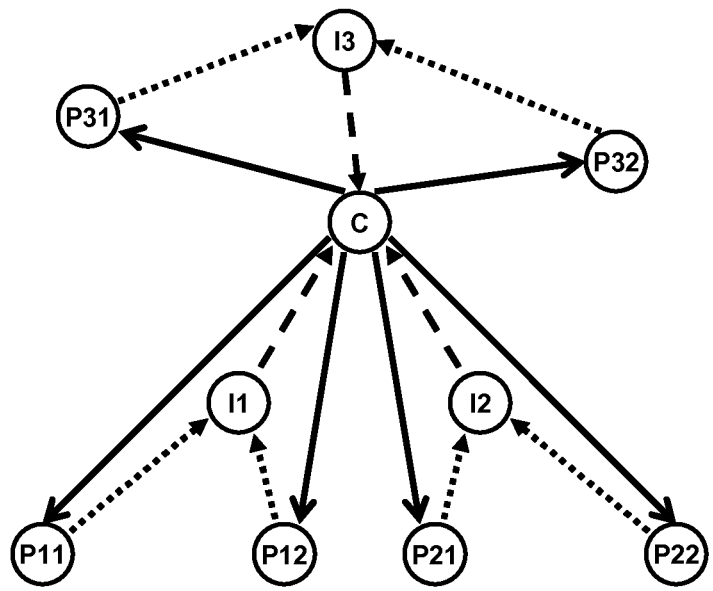

FIG. 17 schematically illustrates an embodiment according to the present invention, e.g. based on the method and nodes illustrated in FIG. 1. The network illustrated in FIG. 17 comprises nodes as illustrated in FIG. 12 and nodes, i.e. 13, P31, and P32, not illustrated in FIG. 12. The direction of arrows indicates the direction of information sent between nodes in the network. The solid line arrows in FIG. 12 illustrates broadcast from the centre node (C) and indicates at least some of the receivers of the broadcast. The broken line arrows illustrate information transmitted from intermediate nodes, i.e. I1, I2, and I3. The dotted line arrows indicate information transmitted from peripheral nodes, i.e. P11, P12, P21, P22, P31, and P32 to respective intermediate nodes.

Figure 18:
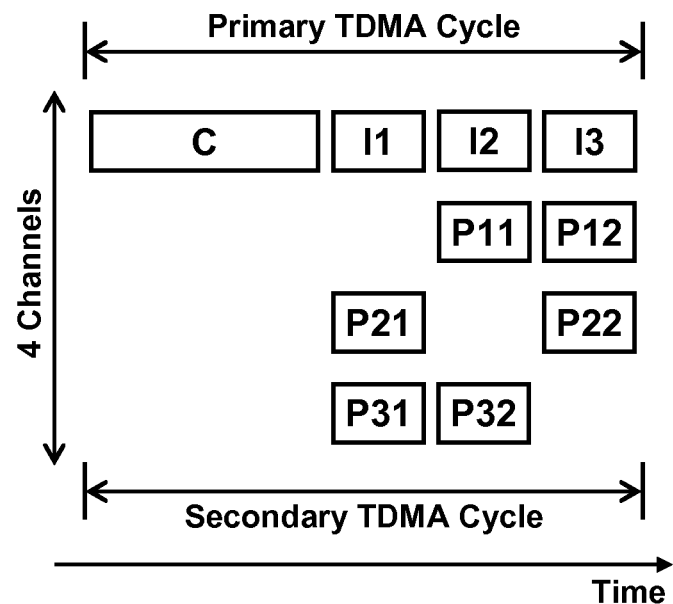

FIG. 18 schematically illustrates a channel allocation diagram illustrating communication from nodes in the embodiment illustrated in FIG. 17. The table illustrates an example of allocated time slots. Time progresses from left to right. An allocated time slot to a node, indicated by a reference to a node illustrated in FIG. 17, indicates that that particular node is broadcasting or transmitting at the indicated time slot. For the situation illustrated in FIG. 18, four radio channels are employed. A first secondary radio channel is employed for transmitting from the first primary peripheral node (P11) and from the second primary peripheral node (P12). A second secondary radio channel is employed for transmitting from the first secondary peripheral node (P21), and from the second secondary peripheral node (P22). A third secondary radio channel is employed for transmitting from the first tertiary peripheral node (P31), and from the second tertiary peripheral node (P32). A centre radio channel is employed for broadcasting from the centre node (C), for transmitting from the first intermediate node (I1), for transmitting from the second intermediate node (I2), and for transmitting from the third intermediate node (I3). The period, within which the transmit/broadcast sequence repeat itself, is for the centre radio channel denoted the "Primary TDMA Cycle", and for the first secondary radio channel, the second secondary radio channel, and the third secondary radio channel denoted "Secondary TDMA Cycle". The "Primary TDMA Cycle" and the "Secondary TDMA Cycle" are of the same length in time.

Figures 19, 20:
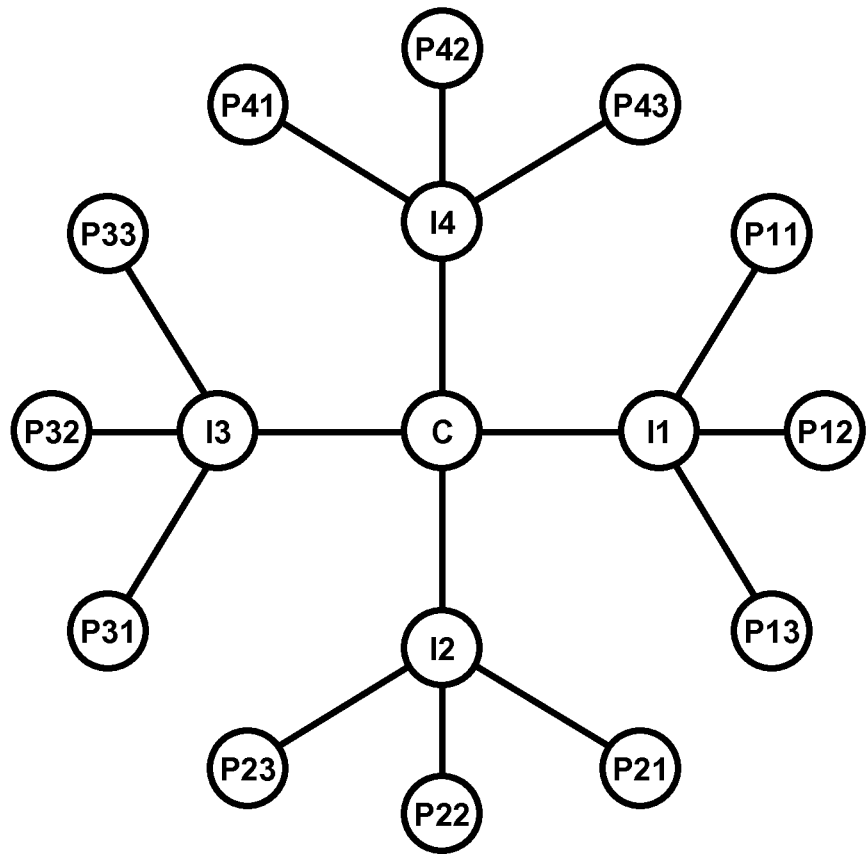

FIG. 19 schematically illustrates an embodiment according to the present invention, e.g. based on the method and nodes illustrated in FIG. 1. The centre node is marked with "C". Intermediate nodes are marked with "IX", where X is a number from 1 to 4 since there are four intermediate nodes in FIG. 19. Peripheral nodes are marked with "PXY", where X is a number from 1 to 4 indicating connectivity with an intermediate node, and where Y is a number from 1 to 3, since each intermediate node has three peripheral nodes connected to it. The lines between nodes indicate pathways from peripheral nodes to the centre node, which pathways go through intermediate nodes. The centre node (C) may broadcast to all or some of the other illustrated nodes. Broadcast is not illustrated in the figure.

FIG. 20 schematically illustrates a communication table illustrating communication from nodes in the embodiment illustrated in FIG. 19. The table illustrates an example of allocated time slots. In particular, the table illustrates time slots for the channels 0-4. Time progresses from left to right. A reference to a node in a time slot indicates that that particular node is broadcasting or transmitting at the indicated time slot for the indicated channel. A hyphen in a timeslot indicates that a particular time slot is not used for a particular channel. For instance, when the centre node (C) is broadcasting, no other node is transmitting, and when the first intermediate node (I1) is transmitting to the centre node, no peripheral node is transmitting to the first intermediate node (I1).

Figure 21:
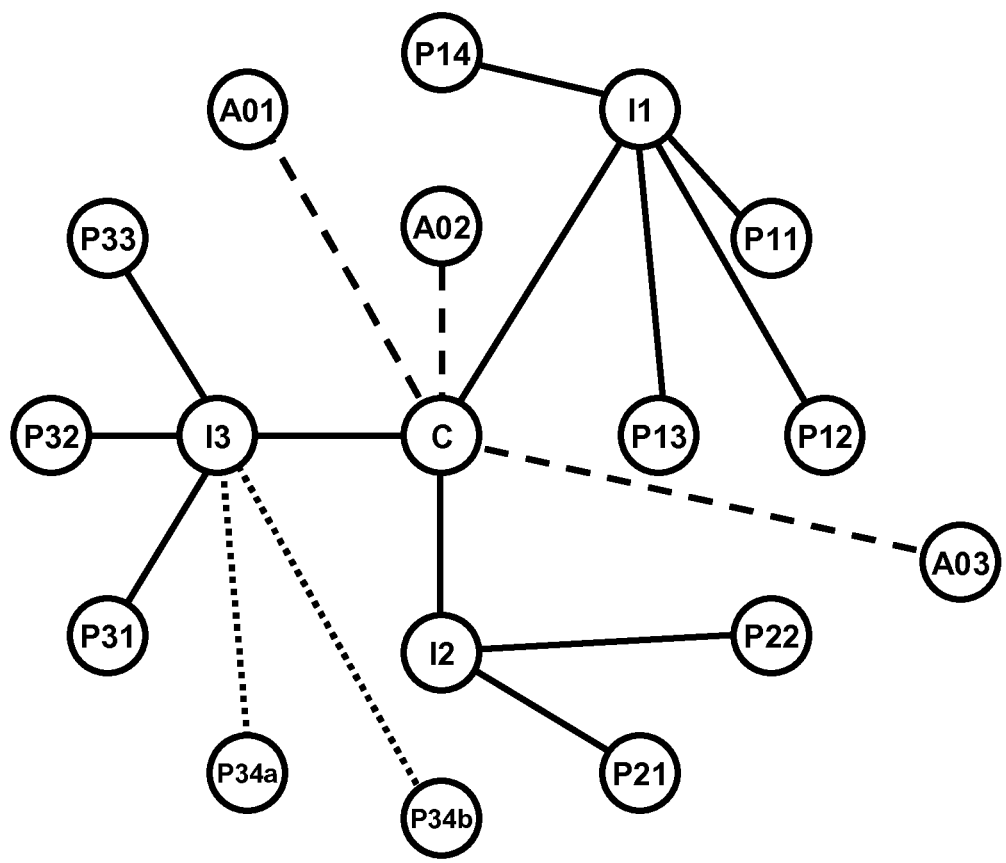

FIG. 21 schematically illustrates an embodiment according to the present invention, e.g. based on the method and nodes illustrated in FIG. 1. The centre node is marked with "C". Intermediate nodes are marked with "IX", where X is a number from 1 to 3 since there are three intermediate nodes in FIG. 19. Peripheral nodes are marked with "PXY", where X is a number from 1 to 3 indicating connectivity with an intermediate node, and where Y is a number ranging from 1 to 4 including possible prefix a/b. The solid lines between nodes indicate pathways from peripheral nodes to intermediate nodes and further from intermediate nodes to the centre node. The broken lines indicate that nodes may "share" a time slot as illustrated further in connection with FIG. 22. The nodes A01, A02, and A03 illustrate that information may be sent directly from non-intermediate nodes to the centre node within a network according to the present invention. This is indicated by the broken lines. The centre node (C) may broadcast to all or some of the other illustrated nodes. Broadcast is not illustrated in the figure.

Figures 22, 23:
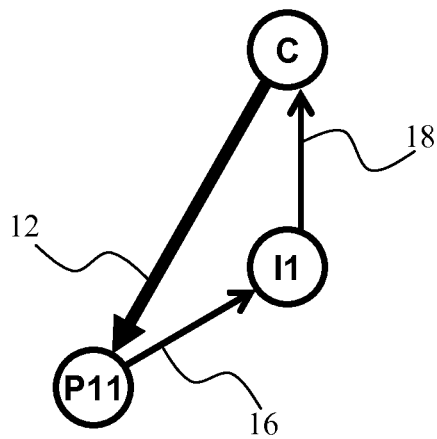

FIG. 22 schematically illustrates a communication table illustrating communication from nodes in the embodiment illustrated in FIG. 21. The table illustrates an example of allocated time slots. The table is divided in three parts with the top part being the first part, the middle part being the second part and the bottom part being the third part. The table illustrates time slots for the channels 0-3. Time progresses from left to right for the individual parts of the table and from the top table to the bottom table and is then repeated from the top table. A reference to a node in a time slot indicates that that particular node is broadcasting or transmitting at the indicated time slot for the indicated channel. A hyphen in a timeslot indicates that a particular time slot is not used for a particular channel. For instance, when the centre node (C) is broadcasting, no other node is transmitting, and when the first intermediate node (I1) is transmitting to the centre node, no peripheral node is transmitting to the first intermediate node (I1).

FIG. 23 schematically illustrates a communication diagram illustrating first nodes and a method according to the present invention for communicating in a network comprising the first nodes. The first nodes comprise a centre node (C), at least one intermediate node including a first intermediate node (I1), and at least one peripheral node including a first primary peripheral node (P11). The method comprises transmitting or broadcasting 12 from the centre node (C). The transmitting or broadcasting 12 from the centre node reaches the first primary peripheral node (P11) and may reach at least one other node of the first nodes. The transmitting or broadcasting 12 is e.g. by means of radio. The transmitting or broadcasting 12 e.g. employs a primary time division multiple access scheme. The method comprises transmitting first primary peripheral information 16 from the first primary peripheral node (P11) to the first intermediate node (I1). The transmission of the first primary peripheral information 16 is e.g. by means of radio. The method comprises transmitting first intermediate information 18 from the first intermediate node (I1) to the centre node (C). The transmission of the first intermediate information 18 is e.g. by means of radio. The transmission of the first intermediate information 18 e.g. employs the primary time division multiple access scheme. Furthermore, the first intermediate information 18 e.g. comprises at least part of the first primary peripheral information 16.

The invention claimed is:

1. A method for communicating in a network comprising a plurality of first nodes, the first nodes comprising a center node, at least two intermediate nodes including a first intermediate node and a second intermediate node, and at least two peripheral nodes including a first primary peripheral node and a first secondary peripheral node, wherein the first intermediate node is between the center node and the first primary peripheral node, and wherein the second intermediate node is between the center node and the first secondary peripheral node, the method comprising:
broadcasting information from the center node utilizing radio and by employing a primary time division multiple access scheme,
receiving the broadcast information directly from the center node at the first primary peripheral node, wherein the information is not forwarded by an intermediate node, and receiving the information broadcast from the center node by at least one other node of the first nodes utilizing radio, wherein the first primary peripheral node and the at least one other node of the first nodes employ a time division multiple access scheme synchronized with the primary time division multiple access scheme,
receiving the broadcast information directly from the center node at the first secondary peripheral node, wherein the broadcast information is not forwarded by an intermediate node, wherein the first secondary peripheral node employs the time division multiple access scheme synchronized with the primary time division multiple access scheme,
receiving the broadcast information directly from the center node at the first intermediate node and the second intermediate node, wherein the broadcast information is not forwarded by an intermediate node, transmitting first primary peripheral information from the first primary peripheral node to the first intermediate node utilizing radio, transmitting first intermediate information from the first intermediate node to the center node utilizing radio and by employing the primary time division multiple access scheme, the first intermediate information comprising at least part of the first primary peripheral information, transmitting first secondary peripheral information from the first secondary peripheral node to the second intermediate node utilizing radio, and transmitting second intermediate information from the second intermediate node to the center node utilizing radio and by employing the primary time division multiple access scheme, the second intermediate information comprising at least part of the first secondary peripheral information.

2. The method according to claim 1, wherein transmitting first primary peripheral information is carried out by employing a first secondary time division multiple access scheme that is synchronized with the primary time division multiple access scheme.

3. The method according to claim 1, wherein transmitting first primary peripheral information is carried out by employing the primary time division multiple access scheme.

4. The method according to claim 1, further comprising: receiving broadcast information from the center node at the first intermediate node.

5. The method according to claim 4, wherein the first intermediate information comprises information which is derived at the first intermediate node.

6. The method according to claim 1, wherein the at least one peripheral node comprises a second primary peripheral node, the method further comprising:
receiving broadcast information from the center node at the second primary peripheral node, and
transmitting second primary peripheral information from the second primary peripheral node to the first intermediate node utilizing radio, the first intermediate information comprising at least part of the second primary peripheral information.

7. The method according to claim 1, wherein the second intermediate information comprises information which is derived at the second intermediate node.

8. The method according to claim 1, wherein transmitting first secondary peripheral information is carried out by employing a second secondary time division multiple access scheme that is synchronized with the primary time division multiple access scheme.

9. The method according to claim 1, wherein transmitting first secondary peripheral information is carried out by employing the primary time division multiple access scheme.

10. The method according to claim 1, wherein a first secondary radio channel is employed for transmitting from the first primary peripheral node, and wherein a second secondary radio channel is employed for transmitting from the first secondary peripheral node.

11. The method according to claim 10, wherein a center radio channel is employed for broadcasting from the center node, for transmitting from the first intermediate node, and for transmitting from the second intermediate node.

12. The method according to claim 10, wherein at least one radio channel selected from a group comprising the first secondary radio channel, the second secondary radio channel, and/or the center radio channel employs at least one multiple access principle selected from a group comprising FDMA, CDMA, Spatial Division, and Antenna sectorization.

13. The method according to claim 1, wherein the first intermediate node comprises sub intermediate nodes including a first primary sub intermediate node and a second primary sub intermediate node, wherein transmitting first primary peripheral information from the first primary peripheral node to the first intermediate node comprises transmitting first primary peripheral information from the first primary peripheral node to the first primary sub intermediate node, and wherein transmitting first intermediate information from the first intermediate node to the center node comprises transmitting first intermediate information from the second primary sub intermediate node to the center node, the method further comprising:
transmitting primary sub intermediate information comprising at least part of the first primary peripheral information from the first primary sub intermediate node to the second primary sub intermediate node.

14. The method according to claim 13, further comprising:
receiving broadcast information from the center node at the first primary sub intermediate node.

15. The method according to claim 13, further comprising:
receiving broadcast information from the center node at the second primary sub intermediate node.

16. A center node configured for communication in a network comprising first nodes, the first nodes comprising the center node, at least two intermediate nodes including a first intermediate node and a second intermediate node, and at least two peripheral nodes including a first primary peripheral node and a first secondary peripheral node, wherein the first intermediate node is between the center node and the first primary peripheral node, and wherein the second intermediate node is between the center node and the first secondary peripheral node, the center node configured to perform communication comprising:
broadcasting information directly from the center node to the first primary peripheral node, wherein the information is not forwarded by an intermediate node, and to at least one other node of the first nodes utilizing radio, wherein the first primary peripheral node and the at least one other node of the first nodes employ a time division multiple access scheme synchronized with the primary time division multiple access scheme,
broadcasting information directly from the center node to the first secondary peripheral node, wherein the broadcast information is not forwarded by an intermediate node, wherein the first secondary peripheral node employs the time division multiple access scheme synchronized with the primary time division multiple access scheme,
broadcasting information directly from the center node to the first intermediate node and the second intermediate node, wherein the broadcast information is not forwarded by an intermediate node,
receiving at the center node first intermediate information from the first intermediate node utilizing radio and by employing the primary time division multiple access scheme, the first intermediate information comprising at least part of first primary peripheral information received by the first intermediate node from the first primary peripheral node utilizing radio,
receiving at the second node second intermediate information from the second intermediate node utilizing radio and by employing the primary time division multiple access scheme, the second intermediate information comprising at least part of first secondary peripheral information received by the second intermediate node from the first secondary peripheral node utilizing radio.

17. A first intermediate node configured for communication in a network comprising first nodes, the first nodes comprising a center node, at least two intermediate nodes including a first intermediate node and a second intermediate node, and at least two peripheral nodes including a first primary peripheral node and a first secondary peripheral node, wherein the first intermediate node is between the center node and the first primary peripheral node, and wherein the second intermediate node is between the center node and the first secondary peripheral node, the first intermediate node configured to perform communication comprising:

receiving at the first intermediate node first primary peripheral information from the first primary peripheral node utilizing radio, transmitting at least part of the first primary peripheral information from the first intermediate node to the center node utilizing radio and by employing a first time division multiple access scheme, receiving broadcast information directly from the center node at the first primary peripheral node, wherein the information is not forwarded by an intermediate node, and receiving the information broadcast from the center node by at least one other node of the first nodes utilizing radio, wherein the first primary peripheral node and the at least one other node of the first nodes employ a time division multiple access scheme synchronized with the primary time division multiple access scheme, receiving broadcast information directly from the center node at the first secondary peripheral node, wherein the broadcast information is not forwarded by an intermediate node, wherein the first secondary peripheral node employs the time division multiple access scheme synchronized with the primary time division multiple access scheme, receiving at the first intermediate node and the second intermediate node information directly from the center node, wherein the broadcast information is not forwarded by an intermediate node, transmitting first secondary peripheral information from the first secondary peripheral node to the second intermediate node utilizing radio, and transmitting second intermediate information from the second intermediate node to the center node utilizing radio and by employing the primary time division multiple access scheme, the second intermediate information comprising at least part of the first secondary peripheral information.

18. A first primary peripheral node configured for communication in a network comprising first nodes, the first nodes comprising a center node, at least two intermediate nodes including a first intermediate node and a second intermediate node, and at least two peripheral nodes including a first primary peripheral node and a first secondary peripheral node, wherein the first intermediate node is between the center node and the first primary peripheral node, and wherein the second intermediate node is between the center node and the first secondary peripheral node, the first primary peripheral node configured to perform communication comprising:

receiving directly at the first primary peripheral node information broadcast from the center node utilizing radio, wherein the information is not forwarded by an intermediate node, the information being broadcast utilizing radio and by employing a primary time division multiple access scheme, utilizing radio and employing a time division multiple access scheme synchronized with the primary time division multiple access scheme, transmitting first primary peripheral information from the first primary peripheral node to the first intermediate node utilizing radio, receiving the broadcast information directly from the center node at the first secondary peripheral node, wherein the broadcast information is not forwarded by an intermediate node, wherein the first secondary peripheral node employs the time division multiple access scheme synchronized with the primary time division multiple access scheme, receiving at the first intermediate node and the second intermediate node information directly from the center node, wherein the broadcast information is not forwarded by an intermediate node, transmitting first intermediate information from the first intermediate node to the center node utilizing radio and by employing the primary time division multiple access scheme, the first intermediate information comprising at least part of the first primary peripheral information, transmitting first secondary peripheral information from the first secondary peripheral node to the second intermediate node utilizing radio, and transmitting second intermediate information from the second intermediate node to the center node utilizing radio and by employing the primary time division multiple access scheme, the second intermediate information comprising at least part of the first secondary peripheral information.

19. A communication network configured for communication, the network comprising:

first nodes, the first nodes comprising a center node, at least two intermediate nodes including a first intermediate node and a second intermediate node, and at least two peripheral nodes including a first primary peripheral node and a first secondary peripheral node, wherein the first intermediate node is between the center node and the first primary peripheral node, and wherein the second intermediate node is between the center node and the first secondary peripheral node, the first nodes being configured to broadcast information from the center node utilizing radio and by employing a primary time division multiple access scheme, to receive the information directly from the center node at the first primary peripheral node, wherein the information is not forwarded by an intermediate node, and receiving the information broadcast from the center node by at least one other node of the first nodes utilizing radio, wherein the first primary peripheral node and the at least one other node of the first nodes employ a time division multiple access scheme synchronized with the primary time division multiple access scheme, to receive the broadcast information directly from the center node at the first secondary peripheral node, wherein the broadcast information is not forwarded by an intermediate node, wherein the first secondary peripheral node employs the time division multiple access scheme synchronized with the primary time division multiple access scheme, to receive the broadcast information directly from the center node at the first intermediate node and the second intermediate node, wherein the broadcast information is not forwarded by an intermediate node, to transmit first primary peripheral information from the first primary peripheral node to the first intermediate node utilizing radio, to transmit first intermediate information from the first intermediate node to the center node utilizing radio and by employing the primary time division multiple access scheme, the first intermediate information comprising at least part of the first primary peripheral information, to transmit first secondary peripheral information from the first secondary peripheral node to the second intermediate node utilizing radio, and to transmit second intermediate information from the second intermediate node to the center node utilizing radio and by employing the primary time division multiple access scheme, the second intermediate information comprising at least part of the first secondary peripheral information.

* * * * *